United States Patent [19]

Duxbury et al.

[11] Patent Number: 5,563,876
[45] Date of Patent: Oct. 8, 1996

[54] FAST PACKET SWITCH

[75] Inventors: Tom Duxbury, Kanata; Brian Wirth; Wayne Burwell, both of Ottawa; Paul Crozier, Kanata, all of Canada

[73] Assignee: Newbridge Networks Corporation, Kanata, Canada

[21] Appl. No.: 278,493

[22] Filed: Jul. 21, 1994

[51] Int. Cl.[6] .............................. H04J 3/02; H04L 12/66
[52] U.S. Cl. .................. 370/58.1; 370/58.3; 370/85.13; 370/85.12; 370/94.3
[58] Field of Search ................................ 370/85.1, 85.4, 370/85.5, 85.12, 85.13, 85.14, 85.15, 94.3, 60, 58.1, 60.1, 58.3, 94.1

[56] References Cited

U.S. PATENT DOCUMENTS 5,361,259  11/1994  Hunt et al. ........................... 370/94.3
5,444,692  8/1995  Basso et al. ........................ 370/85.14

Primary Examiner—Wellington Chin
Assistant Examiner—Huy D. Vu
Attorney, Agent, or Firm—Marks & Clerk

[57] ABSTRACT

The invention provides a very fast distributed frame relay switch. Each switching element is tied to each other switching element using LAN like FDDI technology. Frame relay packets arrive into the switch via lower speed TDM based trunks and can either be switched locally within the same switching element or can be switched to a remote switching element via the FDDI bus. The switching elements themselves reside in a TDM based multiplexer, thus can utilize existing TDM interfaces.

6 Claims, 3 Drawing Sheets

FAST PACKET SWITCH

BACKGROUND OF THE INVENTION

This invention relates to a WAN packet switching system, and more particularly to such a system using LAN type communication facilities.

Existing WAN based frame relay/packet switches have a hardware architecture based upon older connection oriented technology, such as TDM (Time division Multiplex). A connection oriented system is one where a discrete channel is set up through the network between the communicating parties, unlike a connectionless technology, such as frame relay, where packets are routed through the network on a statistical basis over virtual channels. Traditional switching technology relies on a centralized switching complex in which switching elements must be connected in a fully meshed configuration. Since the switches are TDM based, each switching element in the switch is connected using conventional TDM technology.

This type of architecture has a number of shortcomings. Firstly, a fixed amount of dedicated bandwidth is required between the switching elements. This is contrary to modern switching technologies, such as frame relay, which allows bandwidth to be shared between calls on a demand basis.

Secondly, such an architecture means that it is often difficult to expand the switching system off-premises. Particularly, the switching elements (since the system is TDM based and TDM bandwidth is usually very expensive) cannot be fully connected with the full bandwidth requirements of the system. In typical implementations of a distributed switching system, the switching elements are linked via a reduced speed TDM pipe.

Thirdly, the use of centralized switches means that customer traffic must be piped using TDM technology at reduced speeds to a central switching site. There the frames can be switched onto a higher capacity trunk. This means that customer-to-switch bandwidth is dedicated to the switching application.

Fourthly, typical implementations based upon TDM are not usually scaleable. This means that the switching elements cannot easily be added to increase the size of the switch to a higher capacity system. This is usually a result of the fact that less flexible (very expensive) TDM technology would be required to form a fully connected communications mesh between the switching elements.

Finally, TDM based switches are not designed to support switching interfaces of >10 Mb/s. Using TDM technology to connect switching elements means using <10 Mb/s bandwidth.

An object of the present invention is to provide a method of connecting connection-oriented switching elements together to form a scaleable, seamless, very fast, distributed WAN packet switch.

SUMMARY OF THE INVENTION a distributed frame relay switch, comprising a plurality of frame relay switching elements, each switching element forming part of a frame relay wide area network (WAN) and having incoming and outgoing frame relay logical links running over TDM trunks, and each switching element further having a LAN interface for direct connection to a LAN; and an interface hub incorporating a local area network (LAN), said interface hub having ports directly connected to corresponding LAN interfaces in said switching elements, and said local area network acting as a bridge to provide fast frame switching between said frame relay switching elements using a LAN protocol; whereby frames arriving at one said switching element on an incoming logical link can be switched to an outgoing logical link in the same switching element, or switched to another switching element over said local area network The LAN interface can, for example, be an FDDI ring. The concept of employing LAN technology as a means of providing fast packet switching in a Wide Area Network is believed to be novel.

The invention thus employs a LAN (Local Area Network) based technology Interface in a WAN (Wide Area Network) application. In a preferred embodiment, the system employs FDDI (Fiber Data Distributed Interface technology) to interconnect packet switching elements that reside in a TDM based switch/multiplexer. The switching elements are interconnected using a LAN based fabric which is separate from the TDM switching technology. To facilitate easier interconnection, the switching elements are physically connected to an Interconnection Panel known as a FIP.

The above concept has the following advantages:

1. Switching elements can be located off site and located even on the customers premises. Using LAN/FDDI bridges the switching elements can be located many miles away from other switching elements.

2. The nature of the LAN-like FDDI bus automatically lends itself to bandwidth on demand and dynamic bandwidth allocation. Since this is the nature of packet based technology, it optimizes the use of inter-switch element bandwidth.

3. The bandwidth between switching elements is not limited by TDM bandwidth, but only by the speed of the LAN media used by the FASTbus. Speeds up to 100 Mb/s are possible using FDDI, and faster speeds may be possible using other technologies.

4. The design allows operators to increase the size of their switch. In a simple configuration the switch can consist of a single switching element. As more switching performance is required, more switching elements can be cabled together to form a higher capacity switch. The system is completely scaleable. This means that the switch can easily grow as performance requirements increase without having to overhaul the whole system or having to trade-up to a bigger system.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
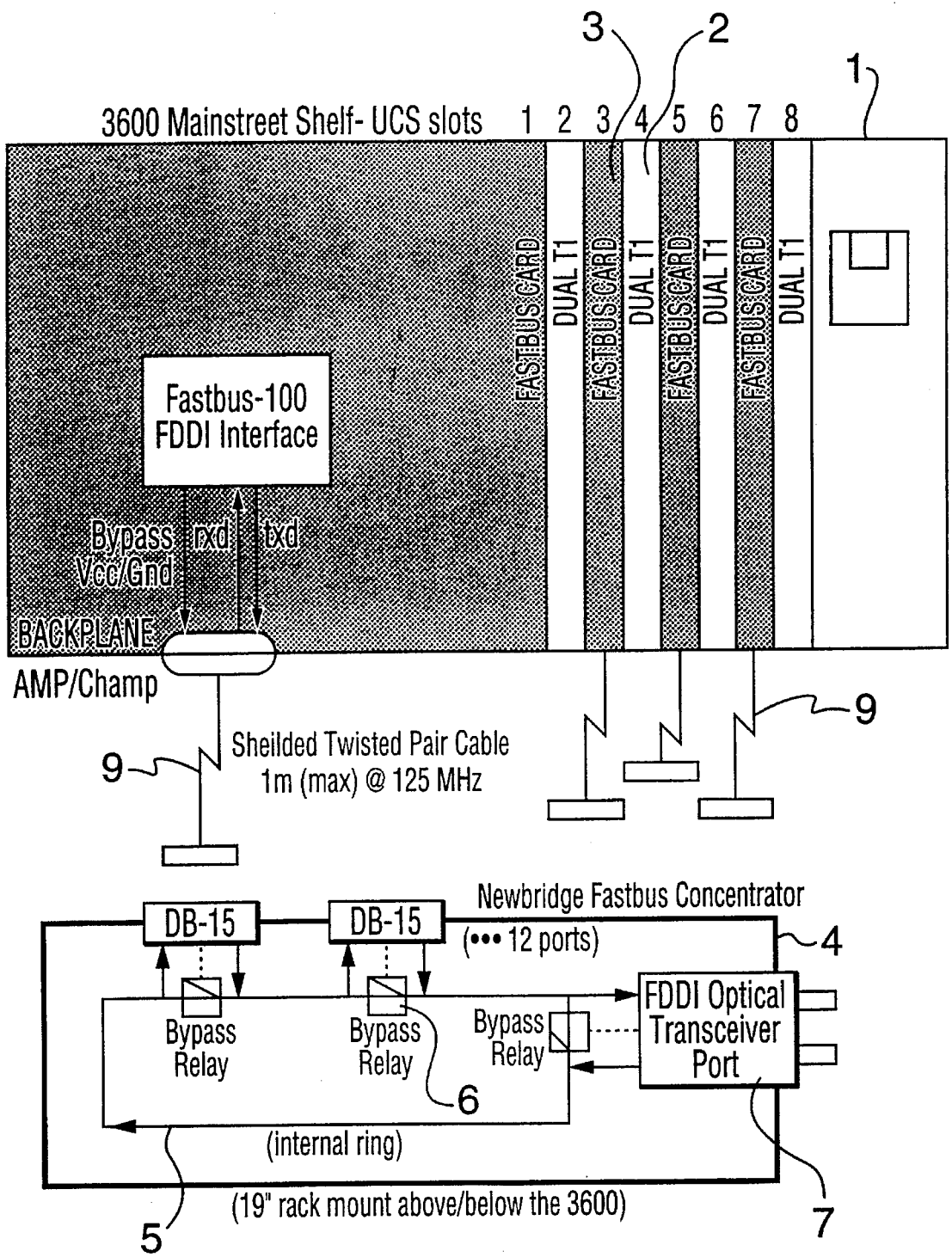
FIG. 1 is a block diagram of a WAN switching system in accordance with the invention.

FIG. 1 shows the backplane of a Newbridge Networks corporation MainStreet® 3600 switch shelf 1 comprising dual T1 cards 2 for connection to T1 links and frame relay engine cards 3 (FREs) forming part of the FDDI interface and which perform frame relay packet switching. Each shelf can switch 16,000 fps (128 byte frames) between backplane frame-relay streams and the frame relay cards in each direction. The total switching capacity of the shelf is between 16,000 and 32,000 fps, depending on the percentage of traffic which is switched locally (ie. between two frame streams on the same card).

Physical interconnection of frame relay cards 3 is achieved using a shielded twisted pair AMP/Champ cable, plugged into a 12-port wiring hub 4 as described more detail in Newbridge Neworks co-pending application Ser. No. 08/278,328, filed on even date herewith, the contents of which are herein incorporated by reference.

The wiring hub 4 is a 19" low-profile rackmount assembly, which performs a "junction box" function. The FDDI ring 5 is carried electrically around the concentrator, using bypass relays 6 in a similar manner to an 802.5 Token Ring Hub (or "MSAU"). Interconnection to other wiring hubs, or any other FDDI equipment, is accomplished with a standard Single Attached Station fiber optic interface 7.

Figure 2:
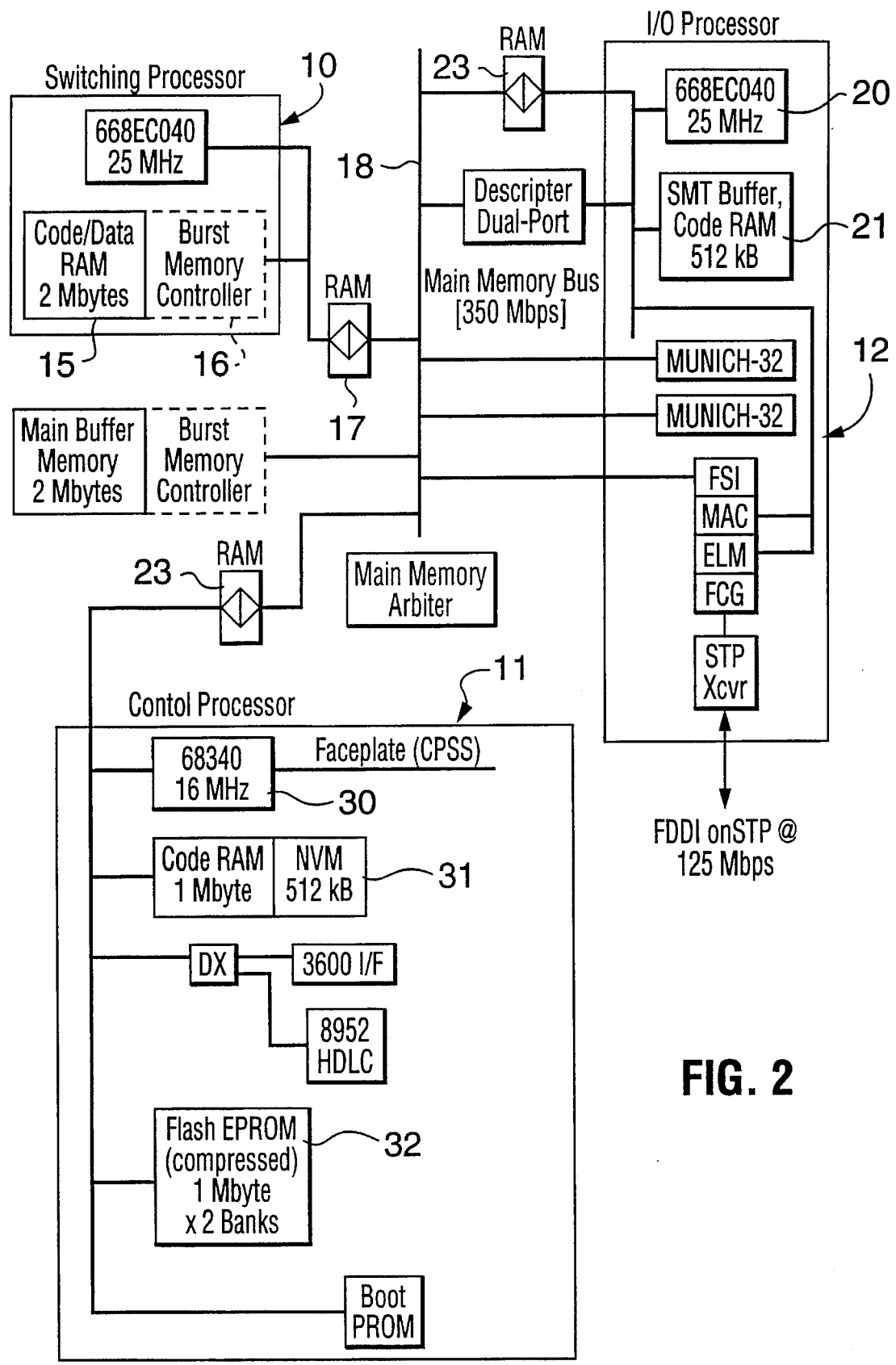
FIG. 2 is a block diagram of a packet switching card for connection to the LAN interface.

As shown in FIG. 2, each FRE card 3 is optimized for the Frame Relay switching application. The card 3 has an aggregate of 42 MIPs computing power distributed over three parallel processors 10, 11, and 12, and the card provides a high-capacity, low-delay switching capability. Dedicated processors 10, 11, and 12 are employed for Switching, I/O and Control. Distribution: 20 MIP 68040: Switching and I/O, 2 MIP 68340 for Control. The card also includes a high performance, common 2 Mbyte buffer pool 13 for extended traffic bursts. Internal access to common buffer pool is at 350 Mbps using fast-page "burst" mode.

The switching processor 10 comprises a 25 Mhz 68EC040 processor 13 and a 2 Mbyte code data RAM 15 connected through Burst Memory controller 16 to Burst Access Module 17 connected to main memory bus 18.

I/O processor 12 has a 25 Mhz 68EC040 processor 20, and an SMT code buffer RAM 21 connected through Descriptor dual-port 22 and Bus Access Module 23 to main memory bus 18.

Control processor 11 includes a 16 Mhz 68340 processor 30 code RAM 31, and Flash EPROM 32 connected through Bus Access Module 23 to main bus 18.

Figure 3:
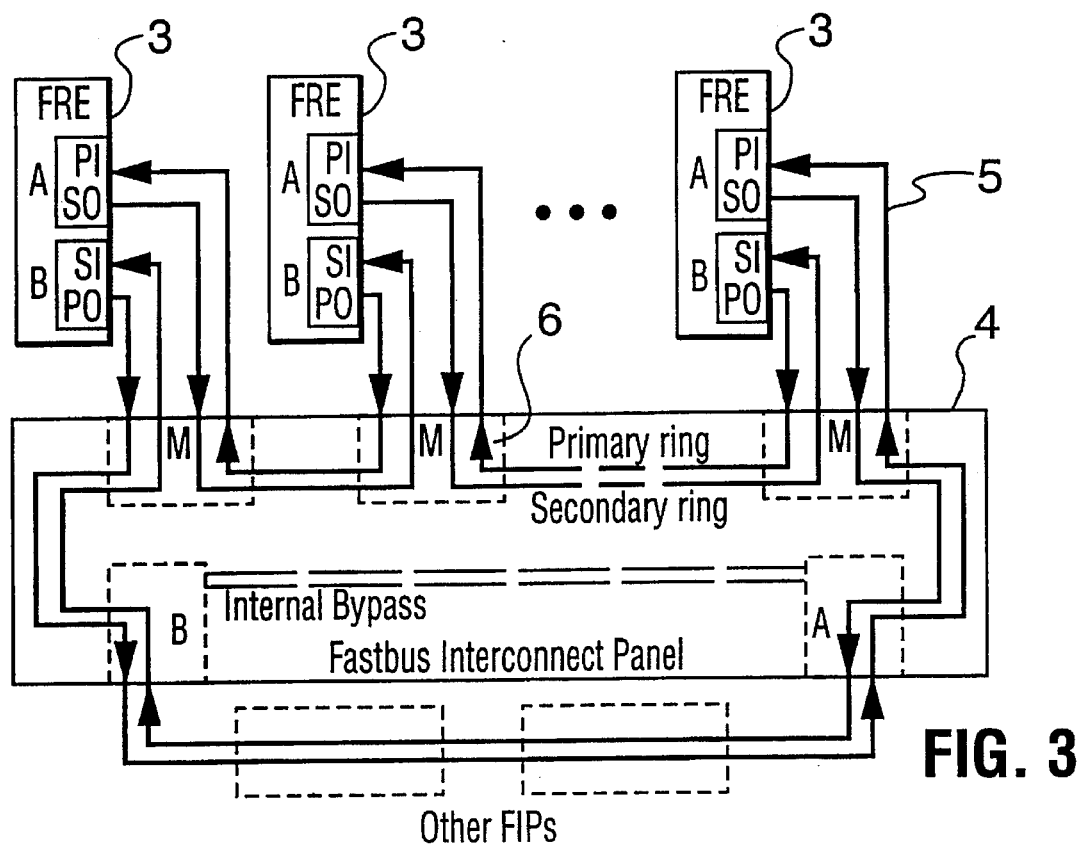
FIG. 3 shows the wiring hub for interconnecting the packet switching cards.

FIG. 3 shows the configuration of the LAN interface. As can be seen each card 3 is connected to FDDI ring 4, and in accordance with the invention use is made of the power of FDDI LAN switching technology to give FRE cards 3 switched access to packets via FDDI ring 4.

Each card 3 supports 4 Mbit/sec bandwidth up to 4 Mbps bidirectionally from the 3600 backplane and physical connection of up to 62 channels (HDLC), each one n*8 kbps, up to a full Mbps link, using 32 channel HDLC controller technology.

The card 3 saturates all 3600 backplane bandwidth: 8,000 fps switching capability (128 byte frames), and provides 100 Mbps interconnect capability to other Fastbus-100 cards using low-cost FDDI over Shielded Twisted Pair wire technology.

The wiring hub 4, including an FDDI ring, ties together up to 12 Fastbus cards, equivalent to three 3600 shelves on a single rack. Each hub 4 handles up to 48,000 fps of frame relay traffic. Although the FDDI ring structure is preserved inside the hub 4, the hub provides a star topology from the hub itself to each card 3. The hub can be regarded as a centralized miniature LAN with spokes radiating to the cards 3. Internal RF relays detect requests for ring insertion from the cards, and automatically bypass inactive nodes.

The cable 9 between the cards 3 and the hub 4 is completely shielded data-grade twisted pair wire to carry the Fastbus-100 information at rates up to 125 Mbps.

To gain access to other FDDI equipment, or to interconnect two hubs, a standard SAS optical port 7 is provided. The fiber optic cable is of the common 62.5/125 multimode type coupled with ST connectors, a common alternative connectorization scheme to the normal FDDI MIC.

Small amounts of concentrator power are provided by the Fastbus cards. The Ring Insert signal energizes a concentrator relay, inserting the Fastbus card into the ring. Each concentrator has a 'presence' indication, and a bidirectional, open-collector signal that requests a mass switchover to the redundant ring.

Maintenance of the FDDI ring is accomplished using a peer-to-peer protocol developed by the ANSI X3T9 committee, SMT (Station Management Protocol). This software is responsible for many aspects of ring management, including communication with adjacent stations.

The wiring hub shown 4 shown in FIG. 3 is known as a FASTbus™ Interconnect Panel (FIP). A key feature of the FIP is the ability to service the unit to replace a faulty component without having to take down the entire ring. Each FIP allows up to 12 FRE cards to be interconnected, with an expansion port to allow up to 6 (or more if necessary) FIPs to be connected together A maximum of 62 WAN circuits can be configured on the each card 3.

A WAN circuit configured to carry frame relay traffic is called a frame stream. The interface speed of each frame stream can be configured to M×N×8 kbps, where M=1 . . . 31, and N=1 . . . 8. The maximum interface speed for a frame stream is 1.984 Mb/s (31 DS-Os). The default interface speed is 64 kbps, and the default transport position is Bit 7 (MSB). All compatible combinations of transport positions and bandwidths are allowed.

The sum of the interface speeds of all configured WAN circuits on the FRE card cannot exceed 3.968 Mbps (62 DS-Os); therefore the total number of active frame streams will depend on the interface speeds of the configured frame streams.

Two DX links are used to connect the 62 WAN circuits from the FRE card to the 3600 switching matrix.

The FASTbus (and FDDI/CDDI) data rate is 100 Mbps. This is encoded at a baud rate of 125 Mbps (5 bits are used to encode 4 data bits). Due to the FDDI framing overhead and the inherent inefficiencies in the FDDI MAC layer protocol, the actual bandwidth available for frame relay traffic across the FASTbus is approximately 80 Mbps. The exact amount of available bandwidth is a function on the Target Token Rotation Time (TTRT), the average frame size and the number of cards on the FASTbus.

Backplane connectorisation is used. Backplane connectorisation is implemented via the 25-pair AMP CHAMP connector on the 3600 backplane. A customized STP (Shielded Twisted Pair) cable is employed.

Each card 3 has a unique 48 bit address which is used by the FDDI Media Access Control (MAC) interface. MAC addresses are universally administered and are stored in the EEPROM.

Each FRE card is assigned a station ID from 1 to 64. Station IDs are user configurable, and are used to uniquely identify a card 3.

The interface on each card 3 is modeled as 64 logical circuits, one for each destination card in a fully configured system. The bus circuits are numbered from 1 to 64, matching the station IDs of the corresponding cards 3. One of the circuits is the "self" circuit, corresponding to the cards own station ID.

Each card 3 is assigned a system ID from 1 to 32,767. The IDs are user configurable, and are used to identify the system to which the card 3 is attached in order to ensure the wiring integrity of the system. If the card 3 is configured with the wrong system ID (or is connected to the wrong bus), the FDP protocol will not detect any other cards on the bus. This will be an indication to the user that something is wrong.

The basic function of the FRE card 3 is to switch frames arriving on an incoming logical data link to an outgoing logical data link or to another FRE card via the bus interface. In this manner, data links are joined together through a frame relay network to create Permanent Virtual Connections (PVCs). PVCs are end-to-end logical connections which extend between two user/network interfaces. A single PVC may pass through several frame relay switching nodes. At each node, a PVC segment is identified by its frame stream and Data Link Connection Identifier (DLCI). All frames carried within a particular frame stream with a particular DLCI are associated with the same PVC (ie. all DLCIs on a frame stream are unique).

On the FRE card, each PVC connection must be configured from a frame stream and DLCI to another frame stream and DLCI, or to a FASTbus circuit and DLCI. Direct connections between two frame streams are called local connections, and connections between a frame stream and a FASTbus circuit are called FASTbus connections. Connections cannot be made to the FASTbus circuit corresponding to the FRE's own station ID, or between any two FASTbus circuits.

A maximum of 1984 PVC connections can be configured on the entire FRE card (3968 DLCIs). All connections are bidirectional. A maximum of 992 PVC connections can terminate on a single frame stream. This number is derived from the valid range of 10-bit DLCIs. A maximum of 1984 PVC connections can terminate on a FASTbus circuit. This number is derived from the total number of connections allowed on the card, and assumes that all PVCs are connected to the same FASTbus circuit.

The two octet address format is used on all WAN frame streams, therefore only 10-bit DLCIs are supported. Some DLCIs are reserved for certain functions or for future applications. Table 1 shows the DLCI ranges and their applications.

Three octet addresses are used on the FASTbus. The DLCIs on the FASTbus range from 2000 to 3983. These DLCIs are valid only on the FASTbus, and never appear on WAN frame streams.

TABLE 1

| DLCI Ranges | |
|---|---|
| DLCI | Application |
| 0 | T1.617 Annex D |
| 1–15 | Reserved (Ref [7]) |
| 16–1007 | User configurable |
| 1008–1022 | Reserved (Ref [7]) |
| 1023 | Local Management Interface (LMI) |
| 1024–1999 | Not used on the FRE card |
| 2000–3983 | FASTbus DLCIs |

The frame relay data link layer is supported as defined in ANSI T1.618. All errored frames are discarded with no error recovery action and no notification to the sender. Errored frames are logged in the statistics.

The FRE card uses three management layer protocols on the FASTbus: Station Management (SMT), FASTbus Discovery Protocol (FDP) and the FASTbus Management Interface (FMI). SMT is an ANSI draft standard.

The FASTbus management protocols are not user configurable.

The FASTbus interface of the FRE card is implemented with FDDI technology. To increase the reliability of the FASTbus, the FRE card supports the SMT draft standard as defined by the ANSI X3T9.5 task group.

The FASTbus Discovery Protocol (FDP) is used to perform the following functions:

1. Determine station IDs of cards which are present on the bus.
2. Monitor the logical link status between cards.
3. Resolve the relationship between station ID and FDDI MAC address.
4. Detect duplicate station IDs on the bus.

The FDP is a state driven protocol which is based on the ICMP router discovery protocol. New cards on the bus are detected within 4 seconds, and the removal of a card is detected within 20 seconds.

A higher level protocol known as the FASTbus Management Interface (FMI) runs between FRE cards after the FDP has discovered their presence. The FMI, which is described in our co-pending patent application Ser. No. 08/278,492, filed on even date herewith, is used to propagate PVC status information across the FASTbus. PVC status changes will typically be propagated within a few milliseconds. If the status change messages are not acknowledged successfully, they will be re-sent after a one second timeout.

The invention therefore provides a very fast distributed frame relay switch. Each switching element is tied to each other switching element using the LAN-based FDDI technology even though the switch is applied to a Wide Area Network. Frame relay packets arrive into the switch via lower speed TDM based trunks and can either be switched locally within the same switching element or can be switched to a remote switching element via the FDDI bus. The switching elements themselves reside in a TDM based multiplexer, thus can utilize existing TDM interfaces.

We claim:

1. A distributed frame relay switch, comprising:

a plurality of frame relay switching elements, each switching element forming part of a frame relay wide area network (WAN) and having incoming and outgoing frame relay logical links running over TDM trunks, and each switching element further having a LAN interface for direct connection to a LAN; and an interface hub incorporating a local area network (LAN), said interface hub having ports directly connected to corresponding LAN interfaces in said switching elements, and said local area network acting as a bridge to provide fast frame switching between said frame relay switching elements using a LAN protocol;

whereby frames arriving at one said switching element on an incoming logical link can be switched to an outgoing logical link in the same switching element, or switched to another of said frame relay switching elements over said local area network.

2. A distributed frame relay switch as claimed in claim 1, wherein said LAN protocol is an FDDI protocol.

3. A distributed frame relay switch as claimed in claim 1, wherein said frame relay switching elements reside in a TDM switch/multiplexer.

4. A distributed frame relay switch as claimed in claim 1, wherein said switching elements are connected to said interface hub in a star topology.

5. A distributed frame relay switch as claimed in claim 1, further comprising a plurality of said interface hubs interconnected using said LAN protocol to permit distributed switching between frame relay switching elements connected to any of said interface hubs.

6. A distributed frame relay switch as claimed in claim 5, wherein said interface hubs are interconnected via optic fibers.

* * * * *